US009920226B2

(12) United States Patent
Wu et al.

(10) Patent No.: US 9,920,226 B2
(45) Date of Patent: Mar. 20, 2018

(54) PRESSURE-SENSITIVE ADHESIVE COMPOSITION, CONDUCTIVE ADHESIVE COMPOSITION AND ADHESIVE TAPE MADE THEREFROM

(71) Applicant: 3M INNOVATIVE PROPERTIES COMPANY, St. Paul, MN (US)

(72) Inventors: Qing Wu, Shanghai (CN); Jing Fang, Shanghai (CN); Fei Gao, Shanghai (CN); Guannan Yin, Shanghai (CN); Hui Zong, Shanghai (CN); Jianda Zhang, Shanghai (CN); Yuting Wan, Shanghai (CN)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 13 days.

(21) Appl. No.: 15/022,003

(22) PCT Filed: Sep. 23, 2014

(86) PCT No.: PCT/US2014/056968
§ 371 (c)(1),
(2) Date: Mar. 15, 2016

(87) PCT Pub. No.: WO2015/048012
PCT Pub. Date: Apr. 2, 2015

(65) Prior Publication Data
US 2016/0230052 A1 Aug. 11, 2016

(30) Foreign Application Priority Data
Sep. 25, 2013 (CN) .......................... 2013 1 0447377

(51) Int. Cl.
*C09J 133/08* (2006.01)
*C09J 4/06* (2006.01)
(Continued)

(52) U.S. Cl.
CPC ............... *C09J 133/08* (2013.01); *C09J 4/06* (2013.01); *C09J 9/02* (2013.01); *C09J 133/06* (2013.01);
(Continued)

(58) Field of Classification Search
CPC ..... C09J 133/08; C09J 4/06; C09J 9/02; C09J 133/06; C09J 133/064; C09J 133/068
(Continued)

(56) References Cited

U.S. PATENT DOCUMENTS 6,620,905 B1 9/2003 Musa
2004/0261660 A1 12/2004 Li
(Continued)

FOREIGN PATENT DOCUMENTS

CN 101851391 10/2010
CN 102952503 3/2013
(Continued)

OTHER PUBLICATIONS

Sudo, "Ring-Opening Polymerization of 1,3-Benzoxazines by p-Toluenesulfonates as Thermally Latent Initiators", Journal of Polymer Science Part A: Polymer Chemistry, 2011, vol. 49, No. 16, pp. 3631-3636.
(Continued)

*Primary Examiner* — Mark Kopec
*Assistant Examiner* — Danny N Kang
(74) *Attorney, Agent, or Firm* — Jean A. Lown

(57) ABSTRACT

The present invention provides a thermally curable pressure-sensitive adhesive composition, which, based on the total weight of the composition, comprises the following components: a) 35-99% by weight of a reactive polymethacrylate component having a glass transition temperature Tg of −35° C. to 32° C., and having a reactive functional group which can react with benzoxazine to form an interpenetrating polymer network; and b) 1-65% by weight of a benzoxazine component of the following formula: wherein: X is selected from the group consisting of a covalent bond, $C_1$-$C_6$ alkylene, $C_3$-$C_{10}$ cycloalkylene group, C=O, S, S=O or O=S=O $R_1$ and $R_2$ are the same or different and independently of each other selected from the group consisting of hydrogen, $C_1$-$C_6$ alkyl, or $C_5$-$C_{14}$ aryl, and R4 is selected from the group consisting of hydrogen, halogen or $C_1$-$C_6$
(Continued)

1. RPABOE 25   3. RPABOE 20
2. RPABOE 24   4. RPABOE 19 alkyl. The present invention also provides an electrically conductive adhesive composition and an adhesive tape comprising the above-described composition, and provides for the use of the composition for preparing membranes used for electronic and electrical products, automobile products and new energy equipment.

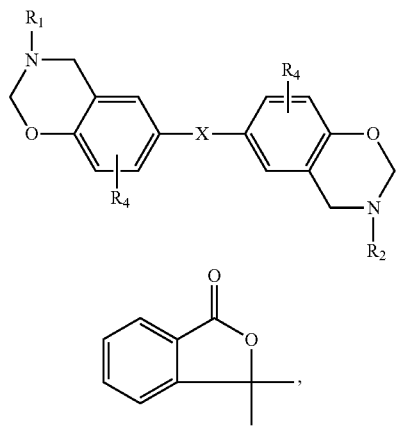

18 Claims, 1 Drawing Sheet

(51) Int. Cl.
*C09J 133/06* (2006.01)
*C09J 9/02* (2006.01)

(52) U.S. Cl.
CPC ....... *C09J 133/064* (2013.01); *C09J 133/068* (2013.01)

(58) Field of Classification Search
USPC ......................................................... 252/500
See application file for complete search history.

(56) References Cited

U.S. PATENT DOCUMENTS

| 2011/0112235 | A1 | 5/2011 | Taden | |
| 2011/0132537 | A1 | 6/2011 | Choi | |
| 2012/0231286 | A1* | 9/2012 | Attarwala | C08F 222/1006 428/522 |
| 2013/0233485 | A1* | 9/2013 | Herr | C09J 7/0264 156/307.1 |
| 2014/0005346 | A1* | 1/2014 | Kitayama | C08F 2/18 526/209 |

FOREIGN PATENT DOCUMENTS

| CN | 105400460 | 3/2016 |
| WO | WO 2003/072638 | 9/2003 |
| WO | WO 2012/071484 | 5/2012 |

OTHER PUBLICATIONS

International Search Report for PCT International Application No. PCT/US2014/056968 dated Dec. 3, 2014, 4 pages.

* cited by examiner

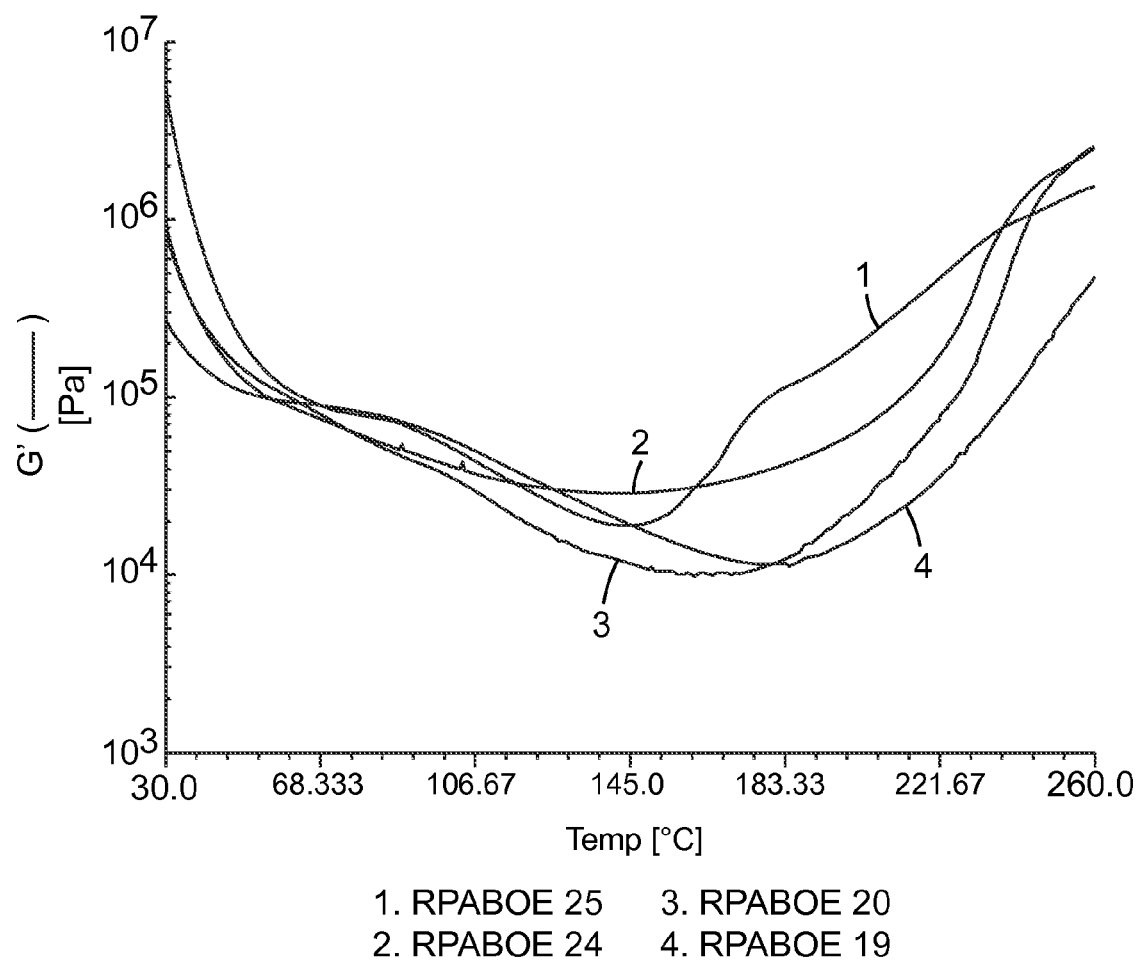

PRESSURE-SENSITIVE ADHESIVE COMPOSITION, CONDUCTIVE ADHESIVE COMPOSITION AND ADHESIVE TAPE MADE THEREFROM

CROSS REFERENCE TO RELATED APPLICATIONS

This application is a national stage filing under 35 U.S.C. 371 of PCT/US2014/056968, filed Sep. 23, 2014, which claims the benefit of Chinese Application No. 201310447377.7, filed Sep. 25, 2013, the disclosure of which are incorporated by reference in their entireties herein.

FIELD OF THE INVENTION

The present invention relates to a thermally curable, high temperature resistant, (semi-)structural pressure-sensitive adhesive composition, an electrically conductive adhesive composition, adhesive tapes made therefrom and the use thereof. The pressure-sensitive adhesives or electrically conductive adhesives can be used for electronic and electrical products, automobile products and new energy equipment (such as solar energy and wind energy equipment).

BACKGROUND OF THE INVENTION

Polyacrylate pressure-sensitive adhesives are a class of adhesive products with a very broad range of applications. Pressure-sensitive adhesives commonly used in industries are normally made by copolymerization of isooctyl methacrylate (IOA) or 2-ethylhexyl methacrylate (2-EHA) and other monomers. These pressure-sensitive adhesives have ideal peel strength on most of bonded surfaces, therefore, have extremely high bonding efficiencies. However, a critical disadvantage of the pressure-sensitive adhesives is their weak bonding strength (shear strength is normally no greater than 1 MPa), and therefore the pressure-sensitive adhesives is not suitable for small area bonding. Meanwhile, polyacrylate pressure-sensitive adhesives normally don't have good temperature resistance. These pressure-sensitive adhesives will gradually degrade at high temperatures causing their strength to decrease.

Polyoxazine resin is a new type of phenolic resin, having overcome the disadvantage of releasing small molecules during forming and curing process of conventional phenolic resins. Therefore, the polyoxazine resin has attracted wide attention of researchers in the aspect of producing high performance materials. However, the polyoxazine resin also has some disadvantages, such as high brittleness, high curing temperature and difficulty in film-forming.

WO2003/072638 discloses a curable composition comprising benzoxazine compounds or resins and at least one other curable unsaturated compounds or resins. Optionally, the composition can further comprise a curing agent or other filling agents. Such compositions can be used as adhesives, coatings and sealants.

However, there is still a need to develop an adhesive having good bonding characteristics while having good storage properties at ambient temperatures.

SUMMARY OF THE INVENTION

In order to overcome the problems existing in prior arts, the inventors of the present invention have discovered that pressure-sensitive adhesive compositions comprising specifically designed polyacrylate and oxazine can overcome the existing problems of storage stability at ambient temperatures with the prior arts while have high bonding strength.

Thus, the present invention provides a thermally curable pressure-sensitive adhesive composition and, based on the total weight of the composition, the composition comprises the following components:

a) 35-99% by weight, preferably 50-99% by weight, of a reactive polymethacrylate component having a glass transition temperature Tg of −35° C. to 32° C., and having a reactive functional group which can react with benzoxazine to form an interpenetrating polymer network; and b) 1-65% by weight, preferably 1-50% by weight, of a benzoxazine component of the following formula:

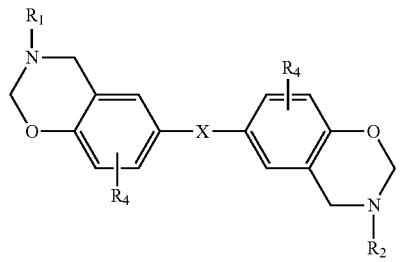

wherein
X is selected from the group consisting of a covalent bond, $C_1$-$C_6$ alkylene, $C_3$-$C_{10}$ cycloalkylene group,

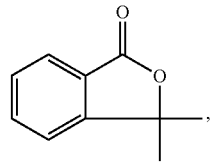

C═O, S, S═O or O═S═O, $R_1$ and $R_2$ are the same or different and independently of each other selected from the group consisting of hydrogen, $C_1$-$C_6$ alkyl, or $C_5$-$C_{14}$ aryl, and $R_4$ is selected from the group consisting of hydrogen, halogen or $C_1$-$C_6$ alkyl.

Another aspect of the present invention provides an electrically conductive adhesive composition, comprising the above-described thermally curable pressure-sensitive adhesive composition, and an electrically conductive material.

Yet another aspect of the present invention provides an adhesive tape, comprising the above-described thermally curable pressure-sensitive adhesive composition, or an electrically conductive adhesive composition, and a base material.

The present invention also provides for the use of the thermally curable pressure-sensitive adhesive composition or the electrically conductive adhesive composition in preparing membranes used for electronic and electrical products, automobile products and new energy equipment.

The thermally curable pressure-sensitive adhesive composition and the electrically conductive adhesive composition of the present invention are high temperature resistant, pressure-sensitive, (semi-)structural adhesive compositions, which have preserved advantages of convenience and effectiveness in the use of ordinary pressure-sensitive adhesive tapes, and can achieve (semi-)structural strength after being thermally cured. Moreover, the compositions of the present invention have excellent long-term (as long as over 12 months at room temperature) storage stability at room temperature.

DESCRIPTION OF THE DRAWINGS

FIG. 1 shows rheological curves of elastic modulus (G') of the reactive polymethacrylate/benzoxazine systems of the pressure-sensitive adhesive compositions RPABOZ-18, RPABOZ-20, RPABOZ-24 and RPABOZ-25 of the present invention.

DETAILED DESCRIPTION OF THE INVENTION i. Definitions

As used herein, the term "structural adhesive" refers to an adhesive with shear strength of greater than 1,000 psi (1 MPa is equivalent to about 145 psi).

As used herein, the term "structural strength" refers to shear strength of greater than 1,000 psi.

As used herein, the term "semi-structural strength" refers to shear strength of greater than 100 psi, but less than 1,000 psi.

The "(semi-)structural adhesive" as described herein can be semi-cured (i.e., incompletely cured), but can achieve semi-structural strength (i.e., structural strength of a semi-structural adhesive) and can meet requirements for the use although being incompletely cured. Such an incompletely cured semi-structural adhesive and the materials to be bound can still be further cured to achieve a higher strength if they are further heated to a certain temperature under practical work conditions.

As used herein, the term "methacrylate" refers to acrylate and/or methacrylate.

As used herein, the term "alkyl" refers to a saturated, straight-chain or branched, non-cyclic hydrocarbon having from 1 to 10 carbon atoms, preferably from 1 to 6 carbon atoms, and more preferably from 1 to 4 carbon atoms. Representative straight-chain alkyls include methyl, ethyl, n-propyl, n-butyl, n-pentyl, n-hexyl, n-heptyl, n-octyl, n-nonyl and n-decyl; while representative branched alkyls include isopropyl, sec-butyl, isobutyl, tert-butyl, isopentyl, 2-methylbutyl, 3-methylbutyl, 2-methylpentyl, 3-methylpentyl, 4-methylpentyl, 2-methylhexyl, 3-methylhexyl, 4-methylhexyl, 5-methylhexyl, 2,3-dimethylbutyl, 2,3-dimethylpentyl, 2,4-dimethylpentyl, 2,3-dimethylhexyl, 2,4-dimethylhexyl, 2,5-dimethylhexyl, 2,2-dimethylpentyl, 2,2-dimethylhexyl, 3,3-dimtheylpentyl, 3,3-dimethylhexyl, 4,4-dimethylhexyl, 2-ethylpentyl, 3-ethylpentyl, 2-ethylhexyl, 3-ethylhexyl, 4-ethylhexyl, 2-methyl-2-ethylpentyl, 2-methyl-3-ethylpentyl, 2-methyl-4-ethylpentyl, 2-methyl-2-ethylhexyl, 2-methyl-3-ethylhexyl, 2-methyl-4-ethylhexyl, 2,2-diethylpentyl, 3,3-diethylhexyl, 2,2-diethylhexyl, 3,3-diethylhexyl, and the like.

The term "$C_1$-$C_6$ alkyl" refers to a straight-chain or branched alkyl having from 1 to 6 carbon atoms, e.g., methyl, ethyl, n-propyl, isopropyl, n-butyl, isobutyl, tert-butyl, and the like. The term "$C_1$-$C_6$ alkylene" refers to a straight-chain or branched alkylene having from 1 to 6 carbon atoms, e.g., methylene (—$CH_2$—), ethylene (—$CH_2CH_2$—), trimethylene (—$CH_2CH_2CH_2$—), —$CH_2$—$CH(CH_3)$—, —$C(CH_3)_2$—, tetramethylene (—$CH_2CH_2CH_2CH_2$—), —$CH_2$—$CH_2$—$CH(CH_3)$—, —$CH_2$—$CH(CH_3)$—$CH_2$—, etc., and the like.

The term "$C_3$-$C_{10}$ cycloalkylene group" refers to a saturated hydrocarbon radical having two free valences and at least one ring that may be bridged or fused. Representative examples include cyclopentylene, cyclohexylene, cycloheptylene, cyclooctylene,

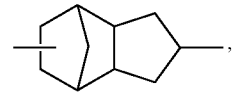

and the like.

The term "halogen" includes fluorine, chlorine, bromine or iodine; preferably fluorine, chlorine or bromine; and more preferably chlorine or bromine.

The term "$C_5$-$C_{14}$ aryl" includes aromatic hydrocarbon groups that may be saturated or unsaturated, fused or bridged.

ii. Pressure-Sensitive Adhesive Composition

The present invention provides a thermally curable pressure-sensitive adhesive composition and, based on total weight of the composition, the composition comprises the following components:

a) 35-99% by weight, preferably 50-99% by weight, of a reactive polymethacrylate component having a glass transition temperature Tg of −35° C. to 32° C., and having a reactive functional group which can react with benzoxazine to form an interpenetrating polymer network; and b) 1-65% by weight, preferably 1-50% by weight, of a benzoxazine component of the following formula:

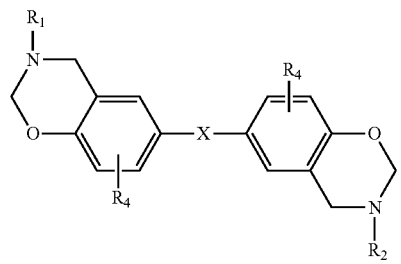

wherein

X is selected from the group consisting of a covalent bond, $C_1$-$C_6$ alkylene, $C_3$-$C_{10}$ cycloalkylene group,

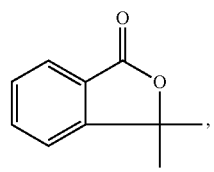

C=O, S, S=O or O=S=O, $R_1$ and $R_2$ are the same or different and independently of each other selected from the group consisting of hydrogen, $C_1$-$C_6$ alkyl, or $C_5$-$C_{14}$ aryl, and $R_4$ is selected from the group consisting of hydrogen, halogen or $C_1$-$C_6$ alkyl.

According to certain embodiments, the benzoxazine is present in an amount of 5-40% by weight, preferably 18-30% by weight, based on the total weight of the composition.

According to certain embodiments, the reactive polymethacrylate component is present in an amount of 60-95% by weight, based on the total weight of the composition.

According to certain embodiments, the reactive polymethacrylate component is present in an amount of 70-82% by weight, based on the total weight of the composition.

According to certain embodiments, the reactive functional group is selected from at least one of the group consisting of epoxy group, carboxyl group and hydroxyl group.

According to certain embodiments, the reactive polymethacrylate is formed by polymerization of one or more monomers selected from the following monomers:
  a1) alkyl methacrylate and/or hydroxyalkyl methacrylate,
  a2) alkyl methacrylate containing epoxy functional group, and
  a3) optionally, methacrylic acid and/or methacrylamide.

According to certain embodiments, the monomer of a1) is present in an amount of 55-99% by weight, preferably 60-95% by weight, and more preferably 60-85% by weight, based on the total weight of all the monomers (i.e., the one or more monomers) being used.

According to certain embodiments, the monomer of a2) is present in an amount of 1-50% by weight, preferably 5-40% by weight, and more preferably 5-30% by weight, based on the total weight of all the monomers (i.e., the one or more monomers) being used.

According to certain embodiments, the monomer of a3) is present in an amount of 0-20% by weight, preferably 0-16% by weight, more preferably 5-15% by weight, and most preferably 10-15% by weight, based on the total weight of all the monomers (i.e., the one or more monomers) being used.

According to certain embodiments, the monomer of a1) is selected from the group consisting of methyl methacrylate, ethyl methacrylate, n-propyl methacrylate, isopropyl methacrylate, n-butyl methacrylate, isobutyl methacrylate, tert-butyl methacrylate, hydroxymethyl methacrylate, hydroxyethyl methacrylate, hydroxypropyl methacrylate, or a mixture thereof.

According to certain embodiments, the monomer of a2) is glycidyl methacrylate.

According to certain embodiments, the monomer of a3) is methacrylamide, acryloyl morpholine, and/or methacrylic acid.

The present invention also provides an electrically conductive adhesive composition, comprising the above-described thermally curable pressure-sensitive adhesive composition, and an electrically conductive material.

According to certain embodiments, the electrically conductive material includes but is not limited to metal particulates, alloy particulates, carbon black, graphene, electrically conductive minerals, electrically conductive organic compounds, surface-conductively-treated base materials, or a combination thereof. The base material that can be used for the present invention may be selected from fibers, small beads, thin slices, and other particulates with irregular shapes.

According to certain embodiments, the electrically conductive material is a surface-conductively-treated fiber (conductive fiber).

According to certain embodiments, the electrically conductive material is present in an amount of 10-90% by weight, preferably 30-70% by weight, and more preferably 40-60% by weight, based on the total weight of the composition. More specifically, the electrically conductive adhesive comprises 10-90% by weight of the electrically conductive material and 10-90% by weight of the thermally curable pressure-sensitive adhesive composition, preferably 30-70% by weight of the electrically conductive material, and more preferably 40-60% by weight of the electrically conductive material and 40-60% by weight of the thermally curable pressure-sensitive adhesive composition, based on the total weight of the composition.

The present invention also provides an adhesive tape comprising the above-described thermally curable pressure-sensitive adhesive composition, or the electrically conductive adhesive composition, and a base material.

The present invention also relates to the use of the above-described thermally curable pressure-sensitive adhesive composition or the electrically conductive adhesive composition in preparing membranes used for electronic and electrical products, automobile products and new energy equipment.

The thermally curable pressure-sensitive adhesive composition of the present invention is preferably cured at temperatures no higher than 220° C. Preferably, curing temperature is 160-220° C., more preferably 170-190° C. Moreover, the thermally curable pressure-sensitive adhesive composition of the present invention can be stored at 40° C., preferably at room temperature, for a long period of time, for as long as 8 months, and more preferably for more than 12 months.

Some components related to the composition of the present invention are described below in more detail.

Component a): Reactive Polymethacrylate Component

The reactive polymethacrylate component of the present invention is polymethacrylate having reactive functional groups. Examples of the reactive functional groups are epoxy group, carboxyl group and hydroxyl group, or a combination thereof.

In the embodiments of the present invention, the reactive polymethacrylate component is present in an amount of 35-99% by weight, preferably 45-95% by weight, more preferably 55-95% by weight, even more preferably 60-95% by weight, and further more preferably 70-82% by weight, based on the total weight of the thermally curable pressure-sensitive adhesive composition.

The reactive polymethacrylate component of the present invention is formed by free-radical polymerization of one or more monomers selected from the following monomers:
  a1) alkyl methacrylate and/or hydroxyalkyl methacrylate,
  a2) alkyl methacrylate containing epoxy functional group, and
  a3) optionally, methacrylic acid and/or methacrylamide.

The inventors of the present invention have discovered that in order to obtain a thermally curable pressure-sensitive adhesive composition with good stability when stored at low temperatures, the components of the composition can be so selected that the reactive polymethacrylate component not only has good compatibility with benzoxazine, but also reacts with benzoxazine at curing temperature during ring-opening of the benzoxazine when it is heated to form an interpenetrating polymer network (IPN) structure.

In an embodiment of the present invention, examples of the alkyl methacrylate in the component a1) include methyl methacrylate, ethyl methacrylate, propyl methacrylate, butyl methacrylate, pentyl methacrylate, hexyl methacrylate, heptyl methacrylate, octyl methacrylate, isooctyl methacrylate, 2-ethylhexyl methacrylate, and the like, including possible isomeric forms thereof. Preferably, the component a1) alkyl methacrylate is selected from the group consisting of methyl methacrylate, ethyl methacrylate, n-propyl methacrylate, isopropyl methacrylate, n-butyl methacrylate, isobutyl methacrylate, tert-butyl methacrylate, or a mixture of more than two types of the methacrylate in the group. More preferably, the component a1) alkyl methacrylate is selected from the group consisting of butyl methacrylate, methyl methacrylate, isooctyl methacrylate, or a mixture of more than two types of the methacrylate in the group.

In an embodiment of the present invention, examples of the alkyl methacrylate in the component a1) include hydroxymethyl methacrylate, hydroxyethyl methacrylate, hydroxypropyl methacrylate, hydroxybutyl methacrylate, including possible isomeric forms thereof. Preferably, the alkyl methacrylate in the component a1) is selected from the group consisting of hydroxymethyl methacrylate, hydroxyethyl methacrylate, hydroxypropyl methacrylate, or a mixture of more than two types of the methacrylate in the group. More preferably, the alkyl methacrylate in the component a1) is selected from the group consisting of hydroxymethyl methacrylate and/or hydroxyethyl methacrylate.

According to an embodiment of the present invention, the component a1) preferably comprises both alkyl methacrylate and hydroxyalkyl methacrylate. The presence of hydroxyalkyl methacrylate is particularly favorable for achieving low curing temperature.

In an embodiment of the present invention, examples of the alkyl methacrylate containing epoxy functional group in the component a2) include methyl methacrylate, ethyl methacrylate, n-propyl methacrylate, isopropyl methacrylate, n-butyl methacrylate, isobutyl methacrylate, which contain a plurality of ternary or quaternary epoxyalkyl (epoxypropyl or epoxybutyl) units, and the like. Preferably, the alkyl methacrylate containing epoxy functional group in the component a2) is the above-described methyl methacrylate substituted by epoxypropyl. Particularly preferably, the alkyl methacrylate containing epoxy functional group in the component a2) includes glycidyl methacrylate, 4-hydroxybutyl acrylate glycidyl ether (4HBAGE), 3,4-epoxycyclohexyl methacrylate, 3,4-epoxycyclohexylmethyl methacrylate, and the like. Preferably, the alkyl methacrylate containing epoxy functional group in the component a2) includes glycidyl methacrylate.

The monomer a1) is present in an amount of 50-99% by weight, preferably 60-98% by weight, based on the total weight of all the monomers (i.e., the one or more monomers) being used.

The monomer a2) is normally present in an amount of 2-70% by weight, and preferably 5-40% by weight, based on the total weight of all the monomers (i.e., the one or more monomers) being used. The inventors of the present invention have discovered that the monomer a2) with the amount in this range is favorable for aging resistance of the pressure-sensitive adhesive.

The monomer a3) is present in an amount of 0-20% by weight, preferably 0-16% by weight, more preferably 5-15%, and most preferably 10-15%, based on the total weight of all the monomers (i.e., the one or more monomers) being used.

In an embodiment of the present invention, the monomer a3) is optional. If present, the monomer a3) can be methacrylic acid, methacrylamide compounds or any mixtures thereof.

The methacrylamide compounds that can be used for the present invention include methacrylamide, such as N-tert-butyl acrylamide, N-hexyl methacrylamide, N-octyl acrylamide, N-nonyl methacrylamide, N-dodecyl methacrylamide, N-hexadecyl methacrylamide, N-methacrylamidocaproic acid, N-methacrylamidoundecanoic acid, N,N-dibutyl acrylamide, N-hydroxyethyl acrylamide, acryloyl morpholine and N-hydroxyethyl methacrylamide. The acryloyl morpholine is preferred. The inclusion of methacrylamide compounds is particularly favorable for achieving low curing temperature.

According to certain particularly preferred embodiments of the present invention, when selecting the reactive polymethacrylate component to be used for the present invention, the difference in solubility parameters should be taken into consideration; on the other hand, the reactive polymethacrylate component should be able to react with benzoxazine during ring-opening of the benzoxazine when it is heated to form an interpenetrating polymer network (IPN) structure.

The reactive polymethacrylate component of the present invention has a glass transition temperature (Tg) of −35° C. to 32° C., preferably −25° C. to 30° C., more preferably −22° C. to 27° C., and most preferably −22° C. to 10° C. Good strength of final adhesive can be achieved after being cured when Tg of the polymethacrylate component falls in this range.

Tg of polymers can be measured by DSC and other conventional methods in the art, or can be calculated by the FOX equation. For the FOX equation, see H E Manjun, et al. Polymer Physics (revised edition), Fudan University Press (October 1990), p. 254.

The FOX equation is an equation used for describing relationship of Tg of a copolymer with composition of the copolymer and with Tg of a homopolymer. For example, for a copolymer formed by monomer units A, B, C and etc., its Tg can be represented by the following equation:

$$\frac{1}{Tg} = \frac{W_A}{Tg_A} + \frac{W_B}{Tg_B} + \frac{W_C}{Tg_C} + \ldots$$

wherein,

Tg is the Tg of copolymer;

$W_A$, $W_B$, $W_C$ and so on are mass fraction of monomer units A, B, C and so on, respectively;

$Tg_A$, $Tg_B$, $Tg_C$ and so on are the corresponding Tg of homopolymer A, homopolymer B, homopolymer C and so on, respectively.

The reactive polymethacrylate component a) of the present invention can be formed by free-radical polymerization of one or more monomers. Initiator, solvent and other auxiliary agents used for the polymerization are conventionally selected by those skilled in the art. These monomers should have good compatibility with benzoxazine. Monomers that can be used are as described above.

The reactive polymethacrylate component a) having reactive functional groups as described above can be synthesized by conventional free-radical polymerization in solvent. The component a) is normally present in an amount of 35-99% by weight, preferably 45-95% by weight, more preferably 55-95% by weight, even more preferably 60-95% by weight, and most preferably 70-82% by weight, based on the total weight of the thermally curable pressure-sensitive adhesive composition. Thus, the component can have good compatibility with benzoxazine and good toughness-enhancing effect on polybenzoxazine resin formed in the composition after being cured.

Component b): Benzoxazine

Benzoxazine is another important component of the thermally curable pressure-sensitive adhesive composition used in the present invention. It can be any benzoxazine that can react during ring-opening when it is heated and has at least two oxazine functional groups. For example, the benzoxazine used for the present invention has the following structure:

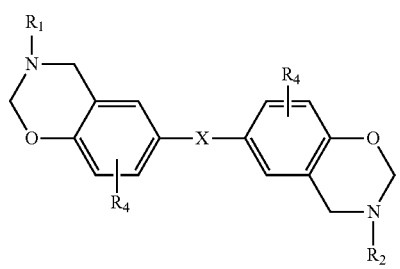

wherein

X is selected from the group consisting of a covalent bond, $C_1$-$C_6$ alkylene, $C_3$-$C_{10}$ cycloalkylene group,

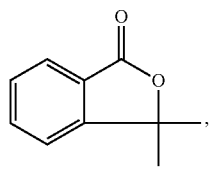

C=O, S, S=O or O=S=O, $R_1$ and $R_2$ are the same or different and selected from the group consisting of hydrogen, $C_1$-$C_6$ alkyl, or $C_5$-$C_{14}$ aryl, $R_4$ is selected from the group consisting of hydrogen, halogen or $C_1$-$C_6$ alkyl.

Preferably, the above group X is methylene, ethylene, straight-chain or branched trimethylene, straight-chain or branched butylene,

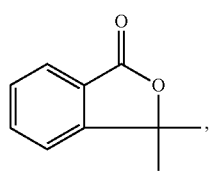

C=O, S, S=O or O=S=O and the like.

Preferably, the above group $R_1$ and $R_2$ are selected from the group consisting of hydrogen, methyl, ethyl, propyl, butyl, phenyl, benzyl, and phenelethyl.

In another embodiment of the present invention, examples of the benzoxazine include:

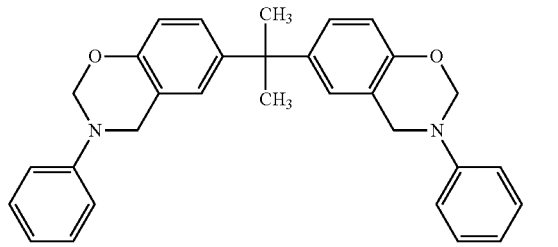

(A)

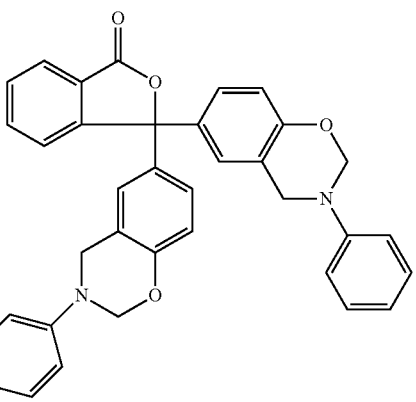

(B)

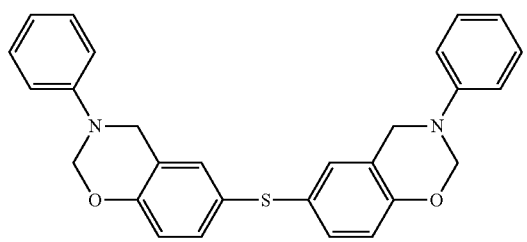

(C)

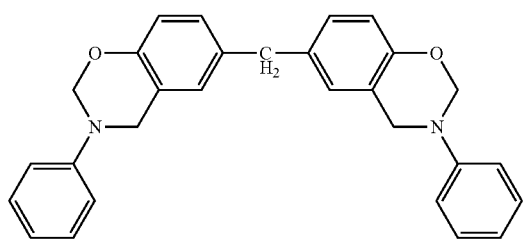

(D)

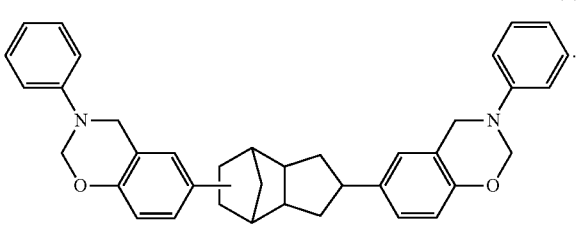

(E)

Commercial products include, for example, ordinary bisphenol-A based benzoxazine resin MT35600 (formula A) from Huntsman Corporation, ordinary bisphenol-A based benzoxazine resin PN001 (formula A) from Shanghai Zhaoyu Chemical Material Co., Ltd., and the like.

The component b) benzoxazine is normally present in an amount of 1-65% by weight, preferably 1-55% by weight, more preferably 1-50% by weight, even more preferably 5-40% by weight, and further more preferably 18-30% by weight, based on the total weight of the thermally curable pressure-sensitive adhesive composition. This will ensure the (semi-)structural adhesive tapes to have adequate strength after being cured.

Without being bound by any theory, it is now believed that the specific composition of benzoxazine and the reactive polymethacrylate component added according to the present invention react with each other simultaneously when heated. A portion of the benzoxazine will react with the reactive polymethacrylate to form IPN, and another portion of the benzoxazine will be cured at low temperatures in the presence of the reactive polymethacrylate to provide semi-structural strength.

iii. Electrically Conductive Adhesive Composition

Another aspect of the present invention provides an electrically conductive adhesive composition, comprising the thermally curable pressure-sensitive adhesive composition and an electrically conductive material. The electrically conductive material includes but is not limited to metal particulates, alloy particulates, carbon black, graphene, electrically conductive minerals, electrically conductive organic compounds, surface-conductively-treated base materials, or a combination thereof. The base material that can be used for the present invention may be selected from fibers, small beads, thin slices, and other particulates with irregular shapes.

Electrically Conductive Fiber

The electrically conductive functional component of the thermally curable pressure-sensitive adhesive composition referred to in the present invention can be electrically conductive fibers. Suitable electrically conductive fibers include practically any fiber materials that have a volume resistivity lower than about 50 microhm-cm ($\mu\Omega$-cm), typically lower than about 4 $\mu\Omega$-cm. Examples of the electrically conductive fibers include fibers made of electrically conductive metals, such as copper, aluminum, silver and gold, and alloys thereof. The electrically conductive fibers can also be prepared by modification of electrical insulative materials, for example, by introducing a medium that provides electrical conductivity into a natural or synthetic polymer (e.g., incorporating metal particulates into fibers). The electrically conductive fibers can also be formed by electroplating or coating a metal on metallic fibers, or by electroplating a metal on non-metallic fiber cores. Metals used for electroplating on fibers include copper, nickel, cobalt, silver, gold, palladium, platinum, ruthenium and rhodium, and alloys thereof. Non-metallic fiber cores include carbon, graphite, glass, polyester, and other synthetic materials. Exemplary metal-electroplated fibers include nickel-electroplated carbon fibers, gold-coated polyethylene fibers, gold-electroplated polypropylene fibers, rhodium-coated fibers, copper fibers, silver fibers, aluminum fibers, and a combination thereof. A combination of the electrically conductive fibers may also be used.

Preferably, the electrically conductive metal is present in the electrically conductive fiber in an amount of 10-60% by weight, preferably 15-30% by weight, and more preferably 15-25% by weight. In an embodiment of the present invention, the ratio of length to diameter of the electrically conductive fiber is about 2-20, preferably 5-15. Preferably, average length of the electrically conductive fiber can be 50-500 microns, preferably 60-300 microns, and more preferably 75-150 microns. Commercial electrically conductive fibers such as, for example, SF82TF20 of Potters Industries Inc., Valley Forge, Pa., has a silver content of 20% by weight and average length×diameter of 130×15 microns.

In the electrically conductive adhesive composition, the electrically conductive material is normally in an amount of 10-90% by weight, preferably 30-70% by weight, more preferably 40-60% by weight, based on the total weight of the electrically conductive adhesive composition. However, more or less amount can also be used. More specifically, the electrically conductive adhesive comprises 10-90% by weight of the electrically conductive material and 10-90% by weight of the thermally curable pressure-sensitive adhesive composition, preferably 30-70% by weight of the electrically conductive material, and more preferably 40-60% by weight of the electrically conductive material and 40-60% by weight of the thermally curable pressure-sensitive adhesive composition, based on the total weight of the electrically conductive adhesive composition. The amount of the reactive polymethacrylate component and benzoxiazine component is consistent with what is described above for the thermally curable pressure-sensitive adhesive composition.

iv. Membrane Preparation

The thermally curable pressure-sensitive adhesive composition and corresponding electrically conductive adhesive composition of the present invention may be coated on a base material to form a membrane.

The base material may include, for example, single-sided release paper or release film.

The compositions can be coated in a liquid form on a base material having a certain thickness with a conventional method, and then solvent is removed by heating to form an adhesive membrane having a certain thickness.

Available coating methods include roller blade coating, comma roll coating, drag blade coating, reverse roll coating, Mayer coating, gravure roll coating, slot die coating, and the like. More preferable coating methods are comma roll coating and slot die coating. The thermally curable, high-temperature resistant, pressure-sensitive semi-structural adhesive of the present invention should have a viscosity between 500 and 23000 cP, preferably between 1500 and 16000 cP, before being coated. Either extraordinarily high or extraordinarily low viscosities are unfavorable for coating of the thermally curable pressure-sensitive adhesive.

Thickness of the thermally curable, high-temperature resistant, pressure-sensitive (semi-)structural adhesive membrane (thickness of dried adhesive) may be between 8 and 250 microns, preferably between 25 and 150 microns, more preferably between 50 and 125 microns. Either extraordinarily high or extraordinarily low viscosities are unfavorable for coating of the thermally curable pressure-sensitive adhesive. Either extraordinarily large or extraordinarily small thicknesses are unfavorable for coating and use of the thermally curable pressure-sensitive adhesive.

v. Advantageous Results of the Present Invention

The inventors of the present invention have surprisingly discovered that the composition or adhesive tape made thereof has the following advantages:
- having initial adhesion and die-cutting mouldability of pressure-sensitive adhesives;
- having low temperature thermal curability;
- having semi-structural to structural strength after being cured;

having high temperature resistance after being cured (150° C. for long term, 280° C. for short term, as reflow soldering process); and having long-term aging resistance.

The thermally curable, high-temperature resistant, pressure-sensitive (semi-)structural adhesive of the present invention demonstrates characteristics of conventional pressure-sensitive adhesive tapes (i.e., having initial adhesion, being able to adhered to an object upon application of minimal pressure, being able to be formed by die-cutting); and can be cured at a certain temperature, and can achieve semi-structural to structural strength after being cured. Cured adhesive tapes have high temperature resistance (150° C. for long term, 280° C. for short term, as reflow soldering process) and long-term aging-resistance. Therefore, they are particularly suitable for applications in electronic and electric, automobile and new energy (solar energy and wind energy) markets.

Another advantage of the present invention is that such thermally curable, high-temperature resistant, semi-structural adhesives and adhesive tapes made thereof according to the present invention can be stored at room temperature for such a long time (as long as over 12 months at room temperature) that transportation and storage costs for the thermally curable, high-temperature resistant, semi-structural adhesives and adhesive tapes made thereof manufactured according to the present invention can be dramatically reduced.

Studies of the inventors have discovered that benzoxazine and polymethacrylate components in the composition of the present invention produce a synergistic effect, which not only provides good temperature-resistance and (semi-)structural strength, but also significantly reduces brittleness of benzoxazine resin, and effectively reduces curing temperature of the system, and provides good film-forming ability for producing adhesive membranes or adhesive tape products. Thus, the thermally curable, high-temperature resistant, pressure-sensitive (semi-)structural adhesives and adhesive tapes made thereof can achieve (semi-)structural strength after being thermally cured, in addition to preserving advantages of convenience and effectiveness in the use of ordinary pressure-sensitive adhesive tapes.

The thermally curable pressure-sensitive adhesive composition of the present invention comprises a hybrid system of reactive polymethacrylate and benzoxazine resin. The thermally curable pressure-sensitive semi-structural adhesive composition may be incompletely cured when being cured. However, it has already achieved semi-structural strength and can fully meet requirement for the use although incompletely cured. Since the special reactive polymethacrylate is reactive and able to form an interpenetrating polymer network (IPN) with benzoxazine, the system can withstand higher temperatures. Meanwhile, such thermally curable, high-temperature resistant (semi-)structural adhesives and adhesive tapes made thereof can be stored at room temperature for as long as over 12 months. Since benzoxazine resin does not release small molecules and has nearly zero shrinkage when being further cured, it will not affect applications.

In addition to permitting prolonged storage at room temperature, the high temperature resistance of the pressure-sensitive adhesive composition of the present invention allows the composition to be used in various fields where demanding requirements are imposed for temperature resistance. For example, firstly, reflow soldering process is used for assembly of hybrid circuit board because of requirement for miniaturization of electronic PCB products. Now, a majority of fabricators have already adopted a lead-free reflow soldering process in order to care more about environment protection. In such a case, the process temperature can reach 260° C. for several minutes (even 300° C. for 5 minutes for testing purpose). Under such conditions, the adhesives or adhesive tapes must not be degraded and can maintain sufficiently high bond strength to ensure reliability of bonded parts. Again, for example, solar cell assembly would have economic values to be commercialized only when they can achieve an outdoor service life of at least 25 years. Therefore, solar cell assembly is generally required to pass the following accelerated ageing test: thermal cycling test (−40° C. to 90° C.), 200 cycles (TC200); damp heat test (85° C./85% RH), 1000 hours (DH1000), and low temperature test (HF10). All these tests require bonding agents to have good temperature resistant properties.

The advantages of the present invention are further illustrated in the following non-limiting examples. However, the specific materials and their amount as well as other experimental conditions used in the examples should not be construed as limiting the present invention. Unless specifically stated, fractions, ratios and percentages are by mass.

EXAMPLES

Test Methods:

In the present invention, the following tests are performed on the specimens obtained in the Examples and Comparative Examples:

1. Thermal Curing Test

The thermally curable, high-temperature resistant, pressure-sensitive semi-structural adhesive tape of the present invention is separated from its release paper, and is adhered to a standard testing aluminum plate with its adhesive surface, and then covered with another standard testing aluminum plate. The two standard testing aluminum plates are clamped together with an iron clamp and placed into an oven for curing at a certain temperature, and then placed in an environment of constant temperature 23° C. and constant humidity of 50% for 24 hours before being tested.

2. Test of Overlap Shear Strength (OLS)

The test is performed in accordance with the methods described in FINAT FTM 2 (FINAT Technical Handbook—Test Methods, $8^{th}$ edition), and shear strength can be directly determined 3. T-Type Peel Strength The electrically conductive adhesive tape is cut into 25-mm-wide specimen strips. The adhesive surface of the adhesive tape is adhered to a 25-micron polyimide (PI) film or a 5-mil anodized aluminum foil, and thermally pressed at 180° C. and 0.4 MPa for 10 seconds (sec). Then, the release paper or release film on the back of the adhesive tape is peeled off, and the PI film or aluminum foil with the adhered adhesive tape is placed on another PI film or aluminum foil with the adhesive surface facing the film or foil, and then thermally pressed at 180° C. and 0.4 MPa for 30 minutes (min). Then, the laminated test strip is placed into an oven of 180° C. and heated for 30 min before being cooled at room temperature for over 1 hour.

The test is performed in accordance with the methods described in FINAT FTM 2 (FINAT Technical Handbook—Test Methods, $8^{th}$ edition), and T-type peel strength can be directly obtained. All the tests are performed with the 25-micron polyimide (PI) film as a base material.

4. Preservation Test at Room Temperature

Preservation at room temperature is evaluated by determining changes in OLS. In other words, initial OLS, P0, of newly made adhesive tapes is determined, and the adhesive tapes are kept in an oven at a certain temperature (40° C.) for a period of time before the OLS, P1, is determined again with the same method. If P1 can be maintained at 80% of P0, preservation period is deemed to be the longest.

5. Test of Curing Extent (Curing Degree)

Curing degree can be conveniently determined with DCS (TA Q200) since curing reaction is generally an exothermic reaction. The amount of released heat depends on the type of functional groups of the resin, the number of the functional groups involved in the reaction, and the type and amount of curing agent. However, for a resin system of a certain formulation, the released heat of the curing reaction is definite. Therefore, the curing degree a can be calculated with the following equation:

$$\alpha = (\Delta H0 - \Delta HR) \times 100\% / \Delta H0$$

wherein ΔH0 is the total amount of heat released (J/g) when the incompletely cured resin system is completely cured, and ΔHR is the residual reaction heat (J/g) after curing.

6. Test of High Temperature Resistance

Thermal stability can be characterized by using thermogravimetric analysis (TA Q500) with an air flow of 60 mL/min and a heating rate of 10° C./min.

7. Test of Aging Resistance

A specimen is cured under certain conditions and then placed into an aging oven at 85° C. and 85% relative humidity for a certain period of time. Then, OLS is determined in accordance with the methods described in Test Method 2.

8. Test of Electrical Conductivity

Electrical conductivity can be tested in accordance with the method described below.

The electrically conductive adhesive tape is cut into 18 mm×18 mm specimens. The adhesive surface of the adhesive tape is adhered to a SUS316L stainless steel strap (Φ15.5 mm in diameter, 0.5 mm in thickness), and thermally pressed at 180° C. and 0.4 MPa for 10 sec. Then, the release paper or release film on the back of the adhesive tape is peeled off, and the stainless steel strap with the adhered adhesive tape is placed in a copper-exposed area on a test plate, with the adhesive surface facing the copper-exposed area, and then thermally pressed at 180° C. and 0.4 MPa for 30 min. Then, the laminated test plate and the stainless steel strap is placed into an oven of 180° C. and heated for 30 min before being cooled at room temperature for over 1 hour.

Electrical resistance between the stainless steel strap and the copper-exposed area on the edge of the test plate is measured with a digital electrical resistance meter.

Information about the raw materials used in the examples is listed in Table 1.

TABLE 1

| Product | Description | Manufacturer |
|---|---|---|
| BA | Butyl acrylate (Tg = −54° C.) | BASF, Germany |
| MA | Methyl acrylate (Tg = 8° C.) | BASF, Germany |
| 2-EHA | (Tg = −67° C.) | BASF, Germany |
| AA | Acrylic acid (Tg = 106° C.) | BASF, Germany |
| ACMO | Acryloyl morpholine (Tg = 145° C.) | Nantong Volant Chem-Corp. |
| GMA | Glycidyl methacrylate (Tg = 75° C.) | Dow Chemical, USA |
| 2-HEA | Hydroxyethyl acrylate (Tg = −15° C.) | BASF, Germany |

TABLE 1-continued

| Product | Description | Manufacturer |
|---|---|---|
| VAZO-67 | 2,2'-azobis(2-methylbutyronitrile) (AMBN), free-radical thermal initiator | Du Pont, USA |
| EA | Ethyl acetate solvent | Shanghai Wujing Chemical Co., Ltd. |
| PN001 | Bisphenol-A based benzoxazine, 70% in methyl ethyl ketone (MEK) | Shanghai Zhaoyu Chemical Material Co., Ltd. |
| SF82TF20 | Electrically conductive fiber, silver content 20% (wt), average length × diameter = 130 × 15 microns | Potters Industries Inc., USA |

Testing Example 1

1. Synthesis of Reactive Polymethacrylate Having Reactive Functional Groups

All the raw materials were weighed according to Table 2-4 below and placed into a 500-mL three-necked flask, and stirred with a pneumatic agitator (Model ZD-J-1, Shanghai Zoda Coating Equipment Co., Ltd.) while being purged with $N_2$ to carry out a reaction for 24 hours (hrs) at an elevated temperature of 60° C. Then, the mixture was allowed to cool to yield a light yellow and clear viscous liquid (with a solid content of 40%). The viscous liquid can be directly used for subsequent experiments without any treatment.

TABLE 2

| | Composition (g) | Tg (° C.) |
|---|---|---|
| RPA-A1 | MA/BA/GMA/EA/VAZO-67 | 87/13/0/149.8/0.2 | −2 |
| RPA-A2 | MA/BA/GMA/EA/VAZO-67 | 80/15/5/149.8/0.2 | −2 |
| RPA-A3 | MA/BA/GMA/EA/VAZO-67 | 73/17/10/149.8/0.2 | −2 |
| RPA-A4 | MA/BA/GMA/EA/VAZO-67 | 65/20/15/149.8/0.2 | −2 |
| RPA-A5 | MA/BA/GMA/EA/VAZO-67 | 59/21/20/149.8/0.2 | −2 |
| RPA-A6 | MA/BA/GMA/EA/VAZO-67 | 44/26/30/149.8/0.2 | −2 |
| RPA-A7 | MA/BA/GMA/EA/VAZO-67 | 30/30/40/149.8/0.2 | −2 |

TABLE 3

| Item No. | Composition (g) | | Tg (° C.) |
|---|---|---|---|
| RPA-B1 | 2-EHA/BA/GMA/EA/VAZO-67 | 87/13/0/149.8/0.2 | −63 |
| RPA-B2 | 2-EHA/BA/GMA/EA/VAZO-67 | 80/15/5/149.8/0.2 | −60 |
| RPA-C1 | MA/BA/GMA/EA/VAZO-67 | 50/45/5/149.8/0.2 | −22 |
| RPA-C2 | MA/BA/GMA/EA/VAZO-67 | 65/30/5/149.8/0.2 | −12 |
| RPA-C3 | MA/BA/GMA/EA/VAZO-67 | 73/22/5/149.8/0.2 | −7 |
| RPA-C4 RPA-A2 | MA/BA/GMA/EA/VAZO-67 | 80/15/5/149.8/0.2 | −2 |
| RPA-C5 | MA/BA/GMA/EA/VAZO-67 | 87/8/5/149.8/0.2 | 3 |
| RPA-C6 | MA/BA/GMA/EA/VAZO-67 | 95/0/5/149.8/0.2 | 10 |
| RPA-C7 | MMA/BA/GMA/EA/VAZO-67 | 60/35/5/149.8/0.2 | 27 |

TABLE 4

| Item No. | Composition (g) | | Tg (° C.) |
|---|---|---|---|
| RPA-D1 | MA/BA/2-HEA/GMA//EA/VAZO-67 | 87/13/0/149.8/0.2 | −63 |
| RPA-D2 | MA/BA/AA/ACMO/EA/VAZO-67 | 80/15/5/149.8/0.2 | −60 |

2. Preparation of Pressure-Sensitive Adhesive Composition

Various components in Table 5 were weighed and placed into a 500-mL flask and stirred for 30 min with a pneumatic agitator (Model ZD-J-1, Shanghai Zoda Coating Equipment Co., Ltd.) to yield a hybrid solution of the reactive polymethacrylate having reactive functional groups/benzoxazine resin. The hybrid solution of the reactive polymethacrylate having reactive functional groups/benzoxazine resin was allowed to stand for 20 min to eliminate air bubbles and then coated on a PET mold release film that is coated with a silicone mold release agent on both sides with a comma roll coater. The thickness of the coat was controlled at 50 microns (thickness of dried adhesive). A thermally curable, high-temperature resistant, pressure-sensitive semi-structural adhesive tape can be obtained after it was dried to remove solvent in an oven at 105° C. for 10 min.

TABLE 5

| Item No. | Composition (g) | OLS (MPa) before aging | OLS (MPa) after aging |
|---|---|---|---|
| RPABOZ-1 | RPA-A1/PN001 | 250/60 | 13.15 | 4.78 |
| RPABOZ-2 | RPA-A2/PN001 | 250/60 | 14.30 | 12.60 |
| RPABOZ-3 | RPA-A3/PN001 | 250/60 | 15.82 | 14.23 |
| RPABOZ-4 | RPA-A4/PN001 | 250/60 | 16.15 | 14.90 |
| RPABOZ-5 | RPA-A5/PN001 | 250/60 | 15.58 | 15.52 |
| RPABOZ-6 | RPA-A6/PN001 | 250/60 | 15.49 | 14.27 |
| RPABOZ-7 | RPA-A7/PN001 | 250/60 | 16.38 | 15.12 |

The adhesive tape was cured at 180 C for 30 min according to the test method 1, and then its OLS was determined according to the test method 2.

It can be seen from the above table that the reactive polymethacrylate RPABOZ-1 to RPABOZ-7 have the same Tg (−2° C.), but different GMA content. It can be seen from the results of Test Example 1 that GMA content has little impact on OLS. The OLS values before aging corresponding to the polymers with different GMA content (0-40%) (but with the same Tg) have essentially little difference. However, the OLS values after aging are more related to the GMA contents. The OLS values after aging would be reduced if the polymer contains no GMA. However, aging resistance can be significantly increased once the polymer contains more than 5% of GMA. That is because the epoxy functional group in GMA monomer can react with benzoxazine resin to yield an interpenetrating polymer network (IPN) structure.

Test Example 2

Various components in Table 6 were weighed and placed into a 500-mL flask and stirred for 30 min with a pneumatic agitator (Model ZD-J-1, Shanghai Zoda Coating Equipment Co., Ltd.) to yield a hybrid solution of the reactive polymethacrylate having reactive functional groups/benzoxazine resin. The hybrid solution of the reactive polymethacrylate having reactive functional groups/benzoxazine resin was allowed to stand for 20 min to eliminate air bubbles and then coated on a PET mold release film that is coated with a silicone mold release agent on both sides with a comma roll coater. The thickness of the coat was controlled at 50 microns (thickness of dried adhesive). A thermally curable, high-temperature resistant, pressure-sensitive semi-structural adhesive tape can be obtained after it was dried to remove solvent in an oven at 105° C. for 10 min. The adhesive tape was cured at 180° C. for 30 min according to the test method 1, and then its OLS was determined according to the test method 2.

TABLE 6

| Item No. | Composition (g) | | OLS (MPa) |
|---|---|---|---|
| RPABOZ-8 | RPA-B1/PN001 | 250/60 | 0.02 |
| RPABOZ-9 | RPA-B2/PN001 | 250/60 | 0.12 |
| RPABOZ-10 | RPA-C1/PN001 | 250/60 | 2.18 |
| RPABOZ-11 | RPA-C2/PN001 | 250/60 | 9.22 |
| RPABOZ-12 | RPA-C3/PN001 | 250/60 | 10.06 |
| RPABOZ-13 (RPABOZ-2) | RPA-C4/PN001 | 250/60 | 14.30 |
| RPABOZ-14 | RPA-C5/PN001 | 250/60 | 17.20 |
| RPABOZ-15 | RPA-C6/PN001 | 250/60 | 19.02 |
| RPABOZ-16 | RPA-C7/PN001 | 250/60 | 18.76 |

It can be seen from the results in Table 6 that the reactive polymethacrylate RPABOZ-8 to RPABOZ-16 have the same GMA content (5%), but different Tg (from −63° C. to 27° C.). When Tg of the reactive polymethacrylate is too low (<−60° C.), its OLS values are also extremely low, and the reactive polymethacrylate essentially have no semi-structural strength. As Tg of the reactive polymethacrylate is increased, its OLS is also increased. However, when Tg reaches 10° C. or above, the increase of OLS becomes unobvious, but brittleness of the adhesive will be increased.

Test Example 3

Various components in Table 7 were weighed and placed into a 500-mL flask and stirred for 30 min with a pneumatic agitator (Model ZD-J-1, Shanghai Zoda Coating Equipment Co., Ltd.) to yield a hybrid solution of the reactive polymethacrylate having reactive functional groups/benzoxazine resin. The hybrid solution of the reactive polymethacrylate having reactive functional groups/benzoxazine resin was allowed to stand for 20 min to eliminate air bubbles and then coated on a PET mold release film that is coated with a silicone mold release agent on both sides with a comma roll coater. The thickness of the coat was controlled at 50 microns (thickness of dried adhesive). A thermally curable, high-temperature resistant, pressure-sensitive semi-structural adhesive tape can be obtained after it was dried to remove solvent in an oven. The adhesive tape was cured at 180° C. for 30 min according to the test method 1, and then its OLS (MPa) was determined according to the test method 2, and its T-type peel strength (N/mm) was determined according to the test method 3.

TABLE 7

| Item No. | Composition (g) | | OLS (MPa) | T-type peel strength (N/mm) |
|---|---|---|---|---|
| RPABOZ-17 | RPA-A2/PN001 | 250/0 | 1.64 | 0.71 |
| RPABOZ-18 | RPA-A2/PN001 | 250/15 | 2.88 | 2.22 |
| RPABOZ-19 | RPA-A2/PN001 | 250/35 | 4.82 | 1.86 |
| RPABOZ-20 (RPABOZ-2) | RPA-A2/PN001 | 250/60 | 14.30 | 1.41 |
| RPABOZ-21 | RPA-A2/PN001 | 250/95 | 15.06 | 1.38 |
| RPABOZ-22 | RPA-A2/PN001 | 250/145 | 12.33 | 0.82 |
| RPABOZ-23 | RPA-A2/PN001 | 250/215 | 11.20 | 0.34 |

It can be seen from the results in Table 7 that content of benzoxazine has impact on OLS and peel strength of the adhesive. Even when the content of benzoxazine is zero (pure reactive polymethacrylate), the OLS of the adhesive after aging at high temperatures can still reach 1.64 MPa.

As the content of benzoxazine is increased, the OLS exhibits a tendency of increase at first and decrease afterwards. This is mainly because the conditions of curing at 180° C. for 30 min are not sufficient for all the benzoxazine to be completely cured. The extra benzoxazine monomers will cause OLS to decrease on the contrary. Also, the peel strength has the similar tendency. It can be seen that as long as the ratio between the reactive polymethacrylate and benzoxazine is properly matched, a formulation with relatively balanced shear force and peel force can be obtained.

Test Example 4

Various components in Table 8 were weighed and placed into a 500-mL flask and stirred for 30 min with a pneumatic agitator (Model ZD-J-1, Shanghai Zoda Coating Equipment Co., Ltd.) to yield a hybrid solution of the reactive polymethacrylate having reactive functional groups/benzoxazine resin. The hybrid solution of the reactive polymethacrylate having reactive functional groups/benzoxazine resin was allowed to stand for 20 min to eliminate air bubbles and then coated on a PET mold release film that is coated with a silicone mold release agent on both sides with a comma roll coater. The thickness of the coat was controlled at 50 microns (thickness of dried adhesive). A thermally curable, high-temperature resistant, pressure-sensitive semi-structural adhesive tape can be obtained after it was dried to remove solvent in an oven. The adhesive tape was cured at 180° C. for 30 min according to the test method 1, and then its OLS (MPa) was determined according to the test method 2, and its T-type peel strength (N/mm) was determined according to the test method 3.

TABLE 8

| Item No. | Composition (g) | | OLS (MPa) | T-type peel strength (N/mm) |
|---|---|---|---|---|
| RPABOZ-24 | RPA-D1/PN001 | 250/60 | 11.64 | 1.52 |
| RPABOZ-25 | RPA-D2/PN001 | 250/60 | 16.28 | 0.97 |

In the two examples as indicated in Table 8, the reactive polymethacrylate RPABOZ-24 contains hydroxyl (—OH) and epoxy groups, while the reactive polymethacrylate RPABOZ-25 contains acrylic acid (AA) and amido groups. It is found that their OLS values are close to the results of the reactive polymethacrylate of RPA-C series having corresponding Tg. However, their initial reaction temperature will be slightly different. See evaluation of curing properties of reactive polymethacrylate/benzoxazine systems for details.

Test Example 5: Evaluation of Aging Properties of the Reactive Polymethacrylate/Benzoxazine Systems Four specimens as indicated in Table 8 were cured at 180° C. for 30 min according to the test method 1, and then their OLS (MPa) was determined according to the test method 2. The specimens were placed into an aging oven at 85° C. and 85% relative humidity, and their OLS was again determined 1 week and 4 weeks later, respectively.

TABLE 9

| | OLS (MPa) | | | T-type peel strength (N/mm) | | |
|---|---|---|---|---|---|---|
| Item No. | before aging | 1 week after aging | 4 weeks after aging | before aging | 1 week after aging | 4 weeks after aging |
| RPABOZ-18 | 2.88 | 2.71 | 2.76 | 2.22 | 2.53 | 2.89 |
| RPABOZ-20 | 4.30 | 13.77 | 14.80 | 1.41 | 1.46 | 1.38 |
| RPABOZ-24 | 1.64 | 10.92 | 10.23 | 1.52 | 1.66 | 1.48 |
| RPABOZ-25 | 6.28 | 15.10 | 14.17 | 0.97 | 1.03 | 1.11 |

It can be seen from the above table that the OLS and T-type peel strength of almost all specimens are well maintained after being aged at 85° C. and 85% relative humidity. Although the OLS and T-type peel strength of some specimens are reduced, they are reduced by a small margin, and they can all be maintained above 90% of their original strengths. They are even increased for some specimens. The results indicate that the (semi-)structural adhesives of the reactive polymethacrylate/benzoxazine systems have excellent aging resistant properties after being cured.

Test Example 6: Evaluation of Curing Properties of the Reactive Polymethacrylate/Benzoxazine Systems Four specimens as indicated in Table 10 were cured at 150° C. for 30 min, at 180° C. for 30 min and at 210° C. for 30 min according to the test method 1, respectively, and then their OLS (MPa) was determined according to the test method 2, and their curing extent was evaluated according to the test method 5.

TABLE 10

| | OLS (MPa) | | | Curing extent (%) | | |
|---|---|---|---|---|---|---|
| Item No. | 150° C. 30 min | 180° C. 30 min | 210° C. 30 min | 150° C. 30 min | 180° C. 30 min | 210° C. 30 min |
| RPABOZ-18 | 1.93 | 2.88 | 5.55 | 15 | 60 | 91 |
| RPABOZ-20 | 12.83 | 14.30 | 15.31 | 20 | 85 | 95 |
| RPABOZ-24 | 5.10 | 11.64 | 12.17 | 28 | 81 | 97 |
| RPABOZ-25 | 16.71 | 16.28 | 18.16 | 60 | 92 | 95 |

It can be seen from the above table that as curing temperature is increased, curing extent is also increased, and the corresponding OLS is also increased. However, judging from the test results of curing extent, the specimens are incompletely cured. Nevertheless, they have already achieved semi-structural strength and can fully meet requirement for the use although incompletely cured. If such incompletely cured semi-structural adhesives and the materials bonded thereto are further heated to reach a certain temperature in actual working environment, they can still be further cured to achieve a higher strength. Since benzoxazine resin does not release small molecules and has nearly zero shrinkage when being further cured, it will not affect applications.

FIG. 1 shows rheological curves of elastic modulus (G') (by ARES Rheometer of TA Instruments, frequency 1 Hz, scanning at temperatures from 30° C. to 260° C.) of the reactive polymethacrylate/benzoxazine systems numbered as RPABOZ-18, RPABOZ-20, RPABOZ-24 and RPABOZ-25 in the above table. The reactive polymethacrylate resins containing different functional groups have different accelerating effects on the curing process of benzoxazine. Those containing AA functional groups have the most obvious accelerating effects on the curing process of benzoxazine (reaction takes place as soon as temperature reaches 145° C.).

Test Example 7: Evaluation of Thermal Stability of the Above 4 Specimens According to the Test Method 6

It can be seen from the TGA data in Table 11 below that all the semi-structural adhesives of the reactive polymethacrylate/benzoxazine systems have excellent thermal stability. Temperatures at which weight loss reaches 5% are mainly above 300° C.

TABLE 11

| Item No. | T5 (° C.) | T10 (° C.) | Tmax (° C.) |
|---|---|---|---|
| RPABOZ-18 | 357 | 376 | 416 |
| RPABOZ-20 | 304 | 355 | 411 |
| RPABOZ-24 | 296 | 351 | 422 |
| RPABOZ-25 | 307 | 350 | 408 |

Test Example 8: Evaluation of Storage Properties of the Reactive Polymethacrylate/Benzoxazine Systems at Room Temperature Storage properties at room temperature of the above four specimens were evaluated according to the test method 4. It can be seen from the Table 12 below that the (semi-) structural adhesives of the reactive polymethacrylate/benzoxazine systems have excellent storage properties at room temperature.

TABLE 12

| Item No. | T5 (° C.) 0 days | T10 (° C.) 1 week | Tmax (° C.) 4 week |
|---|---|---|---|
| RPABOZ-18 | 2.88 | 3.01 | 2.94 |
| RPABOZ-20 | 14.30 | 14.20 | 15.02 |
| RPABOZ-24 | 11.64 | 10.32 | 11.01 |
| RPABOZ-25 | 16.28 | 15.44 | 13.29 |

Test Example 9

Various components in Table 13 below were weighed and placed into a 500-mL flask, and an appropriate amount of EA was added to make the mixed solution suitable for coating, and then stirred for 30 min with a pneumatic agitator (Model ZD-J-1, Shanghai Zoda Coating Equipment Co., Ltd.) to yield a hybrid solution of the reactive polymethacrylate having reactive functional groups/benzoxazine resin with electrically conductive fibers. The above-described solution was allowed to stand for 20 min to eliminate air bubbles and then coated on a PET mold release film that is coated with a silicone mold release agent with a comma roll coater. The thickness of the coat was controlled at 50 microns (thickness of dried adhesive). A thermally curable electrically conductive adhesive tape can be obtained after it was dried to remove solvent in an oven.

TABLE 13

| Item No. | Example 1 | Example 2 | Example 3 |
|---|---|---|---|
| RPA-A1 | 90 | 54 | 36 |
| PM001 | 10 | 6 | 4 |
| SF82TF20 | 0 | 40 | 60 |
| T-type peel strength (N/mm) | | | |
| Al-to-Al | 2.1 | 1.9 | 1.1 |
| PI-to-PI | 1.8 | 1.3 | 0.9 |
| Contact electric resistance (Ω) | | | |
| φ2.0 mm | — | 14.2 | 1.2 |
| Φ3.5 mm | — | 7.7 | 0.5 |

As shown in the above table, Z-axis conductivity is achieved by adding electrically conductive fibers while high viscosity is still maintained.

What is claimed is:

1. A thermally curable pressure-sensitive adhesive composition for forming an interpenetrating polymer network, which, based on the total weight of the composition, comprises the following components:
   a) 35-99% by weight of a reactive polymethacrylate component having a glass transition temperature Tg of −35° C. to 32° C., and having a reactive functional group which can react with benzoxazine to form an interpenetrating polymer network, wherein the reactive polymethacrylate is formed by polymerization of monomers selected from the following monomers:
      a1) alkyl methacrylate and/or hydroxyalkyl methacrylate in an amount of 55-99% based on the total weight of monomers,
      a2) alkyl methacrylate containing epoxy functional group in an amount of 1 to 50% based on the total weight of monomers, and
      a3) optionally, methacrylic acid and/or methacrylamide in an amount of 0 to 20% based on the total weight of monomers; and
   b) 1-65% by weight of a benzoxazine composition of the following formula:

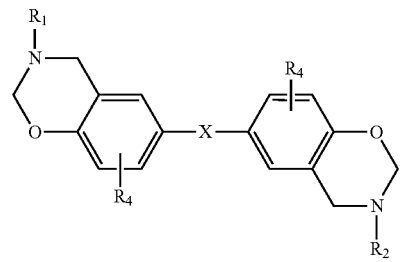

wherein
X is selected from the group consisting of a covalent bond, $C_1$-$C_6$ alkylene, $C_3$-$C_{10}$ cycloalkylene group,

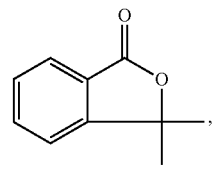

C=O, S, S=O or O=S=O,
$R_1$ and $R_2$ are the same or different and independently of each other selected from the group consisting of hydrogen, $C_1$-$C_6$ alkyl, or $C_5$-$C_{14}$ aryl, and R$_4$ is selected from the group consisting of hydrogen, halogen or C$_1$-C$_6$ alkyl.

2. A thermally curable pressure-sensitive adhesive composition according to claim 1, wherein the benzoxazine component is present in an amount of 5-40% based on the total weight of the composition.

3. A thermally curable pressure-sensitive adhesive composition according to claim 1, wherein the benzoxazine component is present in an amount of 18-30% based on the total weight of the composition.

4. A thermally curable pressure-sensitive adhesive composition according to claim 1, wherein the reactive polymethacrylate component is present in an amount of 60-95% based on the total weight of the composition.

5. A thermally curable pressure-sensitive adhesive composition according to claim 1, wherein the reactive polymethacrylate component is present in an amount of 70-82% based on the total weight of the composition.

6. A thermally curable pressure-sensitive adhesive composition according to claim 1, wherein the monomer of a1) is present in an amount of 55-99% based on the total weight of the one or more monomers.

7. A thermally curable pressure-sensitive adhesive composition according to claim 1, wherein the monomer of a1) is present in an amount of 60-95% based on the total weight of the one or more monomers.

8. A thermally curable pressure-sensitive adhesive composition according to claim 1, wherein the monomer of a2) is present in an amount of 5-30% based on the total weight of the one or more monomers.

9. A thermally curable pressure-sensitive adhesive composition according to claim 1, wherein the monomer of a2) is present in an amount of 5-40% based on the total weight of the one or more monomers.

10. A thermally curable pressure-sensitive adhesive composition according to claim 1, wherein the monomer of a3) is present in an amount of 0-16% based on the total weight of the one or more monomers.

11. A thermally curable pressure-sensitive adhesive composition according to claim 1, wherein the monomer of a3) is present in an amount of 5-15% based on the total weight of the one or more monomers.

12. A thermally curable pressure-sensitive adhesive composition according to claim 1, wherein the monomer of a1) is selected from the group consisting of methyl methacrylate, ethyl methacrylate, n-propyl methacrylate, isopropyl methacrylate, n-butyl methacrylate, isobutyl methacrylate, tert-butyl methacrylate, hydroxymethyl methacrylate, hydroxyethyl methacrylate, hydroxypropyl methacrylate, or a mixture thereof, wherein the monomer of a2) is selected from the group consisting of glycidyl methacrylate, 4-hydroxybutyl acrylate glycidyl ether, 3,4-epoxycyclohexyl methacrylate, 3,4-epoxycyclohexylmethyl methacrylate, or a combination thereof, and wherein the monomer of a3) is selected from the group consisting of methacrylamide and methacrylic acid.

13. An electrically conductive adhesive composition comprising the thermally curable pressure-sensitive adhesive composition according to claim 1, and an electrically conductive material.

14. An electrically conductive adhesive composition according to claim 13, wherein the electrically conductive material is selected from the group consisting of metal particulates, alloy particulates, carbon black, graphene, electrically conductive minerals, electrically conductive organic compounds, and surface-conductively-treated base materials.

15. An electrically conductive adhesive composition according to claim 13, wherein the electrically conductive material is an electrically conductive fiber.

16. An electrically conductive adhesive composition according to claim 13, wherein the electrically conductive material is present in an amount of 10-90% based on the total weight of the electrically conductive adhesive composition.

17. An electrically conductive adhesive composition according to claim 13, wherein the electrically conductive material is present in an amount of 30-70% based on the total weight of the electrically conductive adhesive composition.

18. An electrically conductive adhesive composition according to claim 13, wherein the electrically conductive material is present in an amount of 40-60% based on the total weight of the electrically conductive adhesive composition.

* * * * *

UNITED STATES PATENT AND TRADEMARK OFFICE
CERTIFICATE OF CORRECTION

PATENT NO. : 9,920,226 B2  
APPLICATION NO. : 15/022003  
DATED : March 20, 2018  
INVENTOR(S) : Alvin Wu It is certified that error appears in the above-identified patent and that said Letters Patent is hereby corrected as shown below:

In the Specification

Column 3
Line 53, delete "3,3-dimtheylpentyl," and insert -- 3,3-dimethylpentyl, --, therefor.

Column 9
Line 64 (approx.), delete "phenelethyl." and insert -- phenylethyl. --, therefor.

Column 12
Line 20, delete "benzoxiazine" and insert -- benzoxazine --, therefor.

Signed and Sealed this
Fifth Day of June, 2018

Andrei Iancu
*Director of the United States Patent and Trademark Office*